United States Patent [19]

Haller

[11] 4,397,722

[45] Aug. 9, 1983

[54] POLYMERS FROM AROMATIC SILANES AND PROCESS FOR THEIR PREPARATION

[75] Inventor: Ivan Haller, Chappaqua, N.Y.

[73] Assignee: International Business Machines Corporation, Armonk, N.Y.

[21] Appl. No.: 406,638

[22] Filed: Aug. 9, 1982

Related U.S. Application Data

[63] Continuation-in-part of Ser. No. 221,605, Dec. 31, 1981, abandoned.

[51] Int. Cl.³ .................. C08G 77/00; C08F 2/46
[52] U.S. Cl. ...................... 204/159.13; 528/31; 528/33; 528/42; 528/43
[58] Field of Search .............. 204/159.13; 528/31, 528/43, 42, 33

[56] References Cited

U.S. PATENT DOCUMENTS

| | | | |
|---|---|---|---|
| 3,822,928 | 7/1974 | Smolinsky et al. | 350/96 |
| 4,054,680 | 10/1977 | Sharbaugh et al. | 427/13 |
| 4,096,315 | 6/1978 | Kubacki | 428/412 |
| 4,137,365 | 1/1979 | Wydeven et al. | 428/412 |

OTHER PUBLICATIONS

H. Gilman et al., Ultraviolet Properties of Some Polysilanes, Chemistry and Industry, 6/20/64, p. 1063.

*Primary Examiner*—Theodore E. Pertilla
*Attorney, Agent, or Firm*—Joseph G. Walsh

[57] ABSTRACT

Thermally stable electrically insulating polymers are obtained from aromatic silanes by low power, radio frequency glow discharge polymerization at elevated temperature and low vapor pressure.

10 Claims, No Drawings

POLYMERS FROM AROMATIC SILANES AND PROCESS FOR THEIR PREPARATION

The present application is a continuation-in-part of application Ser. No. 221,605 filed Dec. 31, 1981 and now abandoned.

DESCRIPTION

1. Technical Field

The present invention is concerned with aromatic silane polymers and with a process for their preparation. The polymers are made by low power radio frequency glow discharge polymerization at elevated temperature and low vapor pressure. The polymers are resistant to high temperature, adherent to substrates, and electrically insulating.

2. Prior Art

U.S. Pat. No. 4,137,365 of Wydeven et al describes plasma polymerization of silicon containing monomers to produce polymerized organosilanes. It states at Col. 1, lines 60-68, that glow discharge polymerization of organosilanes has achieved optical substrate coatings resistant to (unspecified) environmental conditions which are tenacious, uniform and optically clear, with abrasion resistance. The organosilanes described are antireflective as well. Aromatic silanes are not mentioned.

U.S. Pat. No. 4,096,315 of Kubacki described depositing on polymethylmethacrylate a silicon containing monomer comprising an organosilane as an intermediate one of several layers of coating. Then the polymer films are treated with an argon plasma, Col. 5, lines 17-37, to cross-link and stress-relieve the polymer films by ultra-violet radiation, temperature elevation and electron bombardment. No mention of aromatic silanes is made in this reference.

U.S. Pat. No. 4,054,680 of Shargaugh et al describes plasma polymerization of organosilanes as well as benzene, toluene and xylene to form a dielectric deposit layer on capacitors and transformers, Col. 3, lines 17-40. No mention of cross-linking is made, nor do the products exhibit resistance to high temperatures such as 500° C.

U.S. Pat. No. 3,822,928 of Smolinsky et al describes polymerization of aromatic hydrocarbons, silicones, vinyltrimethylsilane and hexamethyldisiloxane by means of an RF plasma of the monomer and an "inert gas" including "hydrogen" to yield a smooth pinhole-free film. No mention is made of aromatic silanes, nor does the Smolinsky et al patent make any mention of any silane which is completely aromatic.

Gilman et al "Utraviolet Properties of Some Polysilanes," Chemistry and Industry, June 20, 1964, p. 1063 describes silicon chains with phenyl groups at each end with the formula Ph-(Me$_2$Si)n-Ph where n=2-6. This reference fails to teach any cross-linking. There is no suggestion of the preparation of the materials by means of plasma deposition.

In summary, as far as we are aware, a completely aromatic cross-linked polymer of silicon, hydrogen and carbon is not found in the prior art. Nor is a material resistant to high temperatures about 500° C. found in the prior art.

DISCLOSURE OF THE INVENTION

The present invention is concerned with aromatic silane polymers and with a process for their preparation. The polymers are resistant to temperature above 500° C. and are electrically insulating. They also have the property of being capable of adhering to many different substrates. The polymers are formed from monomers which are completely aromatic silanes. Examples of such materials include phenylsilane, diphenylsilane, disilylbenzene and mixtures thereof. Further examples are substituted aromatic silanes such as chlorophenylsilane. According to the present invention, polymeric films are obtained by subjecting the monomer vapors to a low power RF (Radio Frequency) discharge in the pressure range of 0.03 to 1 torr, and at substrate temperatures of 50° to 450° C. The resulting polymeric products are good insulators ($\rho \sim 10^9$ to $10^{13}$ ohm-cm) if grown at the high end of this temperature range, or if grown at lower temperature but annealed at 400° C.

It should be emphasized that the starting monomers of the present invention are completely aromatic; that is to say, they are free of any aliphatic groups. Another way of saying this is that they contain hydrogen only as part of a phenyl group or attached to a silicon atom. They contain no hydrogen attached to a carbon which is in an aliphatic group. It is an essential feature of the present invention that the material be completely aromatic. Comparative testing has shown that when the silane is not completely aromatic, the heat resistance is severly damaged. This advantage of the present invention is not at all suggested by the prior art.

The polymers of the present invention (when prepared from unsubstituted aromatic silanes) consist of the elements carbon, silicon and hydrogen in various proportions. The predominant structure according to infrared spectral evidence is believed to be cross-linked silicon chains with pendant aromatic groups. The proportions of the elements can be effectively controlled by the substrate temperature and by the choice of starting materials. That is, the proportions of silicon relative to carbon are increased by replacing phenylsilane in part or entirely by disilylbenzene as the vapor in which the glow discharge is maintained. The proportions of silicon-bound hydrogen are decreased (and by implication the degree of cross-linking is increased) by raising the substrate temperature.

When the polymers of the present invention are heated in vacuum to temperatures as high as 400° C., the only chemical change observed is loss of hydrogen from the hydrogen to silicon bonds. No new infrared bands were observed.

Furthermore, the polymeric films exhibit unusual stability when heated to 700° C. in air. While oxidative changes do take place at temperatures between 400° C. and 600° C., no cracks or pinholes develop in the materials, which remain firmly adherent to a variety of substrates. The polymers are also resistant to abrasion. Films of the polymers are useful as protective coatings and as thermally stable insulation. They are, for example, useful insulation for microcircuits.

The following examples are given solely for the purpose of illustration and are not to be considered limitations on the invention, many variations of which are possible without departing from the spirit or scope thereof.

BEST MODE OF CARRYING OUT THE INVENTION

In carrying out the invention, substrate wafers (2.5 cm diameter) of silicon, silicon dioxide or Al$_2$O$_3$ (sapphire), with or without metallization, or of potassium bromide or of stainless steel were held on a thermostated stainless steel pedestal and placed in a chamber where the pressure and flow rate can be controlled by inlet and exhaust valves. Prior to use, they were cleaned (except KBr) by immersion in ultrasonically agitated Alkonox solution, water, acetone, toluene and ethanol, and were dried with Freon vapors. They were exposed to a $N_2$ plasma (0.1 torr, 15 W RF power, 15 min.), then to a plasma in the desired starting material for varying lengths of time. The plasma was excited by a 3 turn external coil coupled to a 13.6 MHz RF generator, at a power level just sufficient to maintain a very dim, doughnut shape discharge above the substrate (typically 2.0 w). The details of the apparatus are not critical for carrying out the invention. Specifically, apparatus commercially available for plasma processing of electronic components could as well be used.

The starting materials were obtained commercially with the exception of disilylbenzene which was synthesized by the method of Bilow, Brady and Segal, J. Org. Chem. 26, 929 (1961) by $LiAlH_4$ reduction of bis-(trichlorosilyl)-benzene. They were purified by distillation and were placed in reservoirs fitted with a needle valve. They were freed of air by repeated evacuation of the reservoirs fitted with a needle valve. They were freed of air by repeated evacuation of the reservoir while immersed in liquid nitrogen. The flow of the vapors of the starting liquids into the plasma chamber was regulated by the needle valve and by thermostatting the reservoir in the vicinity of room temperature. Starting materials with inadequate vapor pressure for the above procedure, such as diphenylsilane, are coated on glass rings filling a flow-through reservoir, and are introduced into the plasma chamber by saturating a low pressure carrier gas, such as hydrogen or argon.

The rate of polymer formation was found to depend on the plasma conditions. High deposition rates are favored by high power input, higher pressure, lower substrate temperature and by higher silicon content of the starting material. While high deposition rates are generally desirable, it will be clear to those skilled in the art that it should be limited to avoid precipitation of polymer in the plasma phase with consequent "snowing out" of polymer. Thus, plasma polymerization of aromatic silanes was carried out over the pressure range of 0.03 to 1 torr and a range of RF power input. Best results were obtained in our apparatus with a pressure at 0.10 torr and RF power of 1.5 to 2 w (power density about 0.02 to 0.04 w/cm$^3$).

Further details of the preparation process and of the properties of the obtained polymers are illustrated by the following specific examples:

EXAMPLE 1

A plasma was maintained in accordance with the above described procedure in phenylsilane at 0.10 torr pressure with 1.5 w RF power for 192 minutes. The polymeric film deposited on a silicon substrate held at 250° C., was transparent, hard, firmly adherent and exhibited interference colors. The mean thickness, as measured with a Tencor Alphastep Instrument, was 2.05 micrometers.

EXAMPLE 2

A polymeric film of similar appearance was deposited in a thickness of 1.91 $\mu m$ in 55 minutes under similar conditions, except a substrate temperature of 150° C. was used. The material was found to be neither dissolved nor swelled in any common organic solvent. No attack on the polymer was observed upon immersion in cold or boiling hydrochloric or formic acid, or in nitric acid at room temperature. A brown coloration and partial peeling was seen, however, upon immersion in hot nitric acid.

EXAMPLE 3

The procedure of Example 1 was repeated with disilylbenzene and with p-chlorophenylsilane as starting materials, for deposition times of 65 and 26 minutes, respectively. The thickness of the deposited films were 1.95 and 2.55 $\mu m$. Repeating the process with substrate temperatures of 450° C., the deposition rates using phenylsilane, disilylbenzene and p-chlorophenylsilane were 0.004, 0.019 and 0.044 $\mu m/min$. respectively.

EXAMPLE 4

Infrared spectra of the thin films of polymer formed in an RF glow discharge at a pressure $p=0.1$ torr and at substrate temperatures ranging from 50° to 450° C. were examined. In the phenylsilane polymers, the the lower frequency C-H stretches are much less intense than the 3040 cm$^{-1}$ band indicative of aromatic C-H stretches. Considering that aliphatic C-H stretches generally have much larger absorption coefficients than aromatic ones, we conclude that the fraction of hydrogen that is bonded to aliphatic carbons is negligible in the phenylsilane plasma polymer. Analogous results were obtained for the plasma polymers of diphenylsilane, disilylbenzene, and p-chlorophenylsilane. It appears that the fragmentation of the benzene rings of the intermediates in the plasma polymer formation is an insignificant process in the case of the arylsilanes, whereas it is a major one in the aromatic compounds having no silyl substituents. A likely interpretation of this is that the excess vibrational energy of the intermediates, which normally leads to the fragmentation of the aromatic rings, is rapidly dissipated in the breakage of the weak Si-H bonds.

EXAMPLE 5

A polymer film approximately 25 $\mu m$ thick was deposited from a phenylsilane plasma at 0.1 torr in 218 minutes on a silicon substrate at a temperature of 50° C. The group of low-intensity bands in the 1670 to 2000 cm$^{-1}$ region of the infrared spectrum was found to exhibit a pattern that is characteristic [J. R. Dyer, "Applications of Absorption Spectroscopy of Organic Compounds," Prentice-Hall, Englewood, Cliffs, NJ (1965), p. 52] of monosubstituted benzene rings. Furthermore, a strong infrared band was found at 1363 cm$^{-1}$ in disilylbenzene, in bis-(trichlorosilyl)-benzene and in all plasma polymers prepared from disilylbenzene. It is therefore thought to be characteristic of benzene rings with two silicon substituents. This band was found to be absent in all plasma polymers prepared from phenylsilane. Hence, it is believed that phenylsilane plasma polymers contain the benzene rings predominantly in monosubstituted form. This implies a structure of interconnected silicon chains with pendant phenyl groups.

EXAMPLE 6

In the infrared spectra of the series of polymers of Example 3, the ratio of the intensities of the 2100 cm$^{-1}$ band, characteristic of Si-H bands and of the 3040 cm$^{-1}$ band, characteristic of aromatic C-H bands, was examined. For phenylsilane plasma polymers prepared at substrate temperatures of 50°, 150°, 250°, 350°, and 450° C., their ratio was found to be 3.2, 1.7, 1.2, 1.02 and 0.97, respectively. The decrease in the silicon-bound hydrogen with increasing substrate temperature implies a higher degree of cross-linking at higher substrate temperatures. Similar results were obtained on plasma polymer films prepared from disilylbenzene at a series of substrate temperatures.

EXAMPLE 7

A plasma polymer film prepared from disilylbenzene at a substrate temperature of 50° C. was placed in a vacuum oven ($p = 6 \times 10^{-5}$ torr) and heated successively to 100°, 200°, and 350° C. for 15 minutes each. After each successive heat treatment the sample was cooled to room temperature, removed from the vacuum, and its infrared spectrum was recorded. No changes in the spectra were observed compared to one taken prior to the heat treatments except in the intensities of bands involving Si-H vibrations. That is, except for an increase in the degree of cross-linking, no chemical changes took place in this temperature range. Another disilylbenzene plasma polymer film, prepared at 450° C., was heated in vacuo to 500° C. No change in the IR spectrum was found. Plasma polymer films prepared from phenylsilane at various substrate temperatures, were similarly observed to be stable in vacuo to 400° C., and only a small decrease in the intensity of the 3040 cm$^{-1}$ aromatic C-H vibration was observed upon heat treatment at 500° C.

EXAMPLE 8

A stainless steel plate having a phenylsilane plasma polymer coating of about 1 μm thickness was placed in a propane-oxygen flame until bright red hot. No cracking, peeling or any other change in the appearance of the coating was seen.

EXAMPLE 9

Stainless steel plates having plasma polymer coatings from phenylsilane (plate A) and from toluene (plate B) were placed in an oven in air and treated successively for 15 minutes at 400°, 500°, 600°, and 700° C. No visually observable change occurred in the coating on plate A, while the coating on plate B visibly carbonized at 400° C. and disappeared at 500° C. As measured electrically with a Ga/In alloy drop placed on top, the coating on plate A remained pinhole free.

EXAMPLE 10

Plasma polymer films from phenylsilane and disilylbenzene on infrared transparent substrates were heated in air, and their spectra before and after heating were compared. At temperatures exceeding the substrate temperatures in preparation, a decrease in bands characteristic of silicon-hydrogen bonds and an increase in bands involving Si-O bonds were seen, but otherwise no changes in the IR spectra occurred below 400° C. Evidence of C-O bond formation was first observed at 400° C. and a substantial loss of C-H intensity occurred at 500° C. The spectrum after treatment at 600° C. in air bore little resemblance to the original one, but the films remained transparent and firmly adherent to the substrates.

EXAMPLE 11

On an Al$_2$O$_3$ substrate, onto which 140 nm thick molybdenum stripes separated by 0.05 mm had been evaporated, a phenylsilane plasma polymer film of about 1.8 μm thickness was deposited at a substrate temperature of 250° C. Resistances were measured both in the plane of the films between adjacent molybdenum electrodes and through the thickness of the film by placing a drop of Ga/In alloy on top. As prepared, the resistivity of the film was $4 \times 10^6$ ohm-cm. The sample was then placed in an oven in air for 30 minutes at 400° C. After cooling, the film's resistivity was $4 \times 10^9$ ohm-cm. Another film of phenylsilane plasma polymer prepared at a substrate temperature of 450° C. showed a room temperature resistivity of about $10^{13}$ ohm-cm. A plasma polymer film prepared from disilybenzene with a substrate temperature of 450° C. was found to have a resistivity of $2 \times 10^{12}$ ohm-cm.

EXAMPLE 12

A plasma polymer film prepared from disilylbenzene at a temperature of 450° C. on an Al$_2$O$_3$ wafer substrate, was repeatedly rubbed with a pencil or ink eraser (Eberhard Faber #110). No haziness or scratchmarks were observable either visually or under a microscope. The force and the duration of the rubbing was more than what was needed to make comparison pieces of polystyrene, acrylic, or bis-phenol-A polycarbonate plastics completely hazy.

I claim:

1. A polymer formed by low power, radio frequency glow discharge polymerization of a completely aromatic silane monomer at elevated temperature and low vapor pressure.

2. The polymer as claimed in claim 1 wherein the monomer is phenylsilane.

3. The polymer as claimed in claim 1 wherein the monomer is diphenylsilane.

4. The polymer as claimed in claim 1 wherein the monomer is disilylbenzene.

5. The polymer as claimed in claim 1 wherein the monomer is parachlorophenylsilane.

6. A process for forming a polymer, said process comprising the low power, radio frequency glow discharge polymerization at elevated temperature and low vapor pressure of a completely aromatic silane monomer.

7. The process as claimed in claim 6 wherein the monomer is phenylsilane.

8. A process as claimed in claim 6 wherein the monomer is diphenylsilane.

9. A process as claimed in claim 6 wherein the monomer is disilylbenzene.

10. A process as claimed in claim 6 wherein the monomer is parachlorophenylsilane.

* * * * *